United States Patent [19]

Isley

[11] Patent Number: 4,972,890
[45] Date of Patent: Nov. 27, 1990

[54] LOG FEED ROLLER MECHANISM

[76] Inventor: Reggald E. Isley, 9024 - 108th St., Grande Prairie, Alberta, Canada, T8V 4C8

[21] Appl. No.: 427,465

[22] Filed: Oct. 25, 1989

[51] Int. Cl.⁵ .............................................. B27B 31/00
[52] U.S. Cl. .............................. 144/246 R; 144/2 Z; 144/246 A; 144/246 C; 198/624; 198/722
[58] Field of Search ............... 414/746.7; 198/624, 198/722, 780; 144/246 R, 247, 248, 249 R, 249 A, 246 F, 246 A, 2 Z, 3 D, 246 C

[56] References Cited

U.S. PATENT DOCUMENTS

| | | | |
|---|---|---|---|
| 325,339 | 9/1885 | Hanavan | 144/246 C |
| 1,514,505 | 11/1924 | Conklin | 144/246 R |
| 2,588,121 | 3/1952 | Johnson | 144/246 R |
| 2,631,618 | 3/1953 | Arvidson | 144/246 R X |
| 3,045,728 | 7/1962 | Hutchinson et al. | 144/246 R |
| 3,342,313 | 9/1967 | Dearsley | 198/722 |
| 3,797,541 | 3/1974 | Kurelek et al. | 144/3 D |
| 3,972,358 | 8/1976 | Kappler | 144/3 R |
| 3,981,336 | 9/1976 | Levesque | 144/3 D |
| 3,994,327 | 11/1976 | Bergholm et al. | 144/246 F |
| 4,050,485 | 9/1977 | Valo | 144/2 Z |
| 4,257,461 | 3/1981 | Wangeby et al. | 144/2 Z |
| 4,385,650 | 5/1983 | Schmidt | 144/246 C |
| 4,509,574 | 4/1985 | Gaitten | 144/246 F |
| 4,515,192 | 5/1985 | Eriksson | 144/2 Z |
| 4,552,191 | 11/1985 | Kuvsilinna | 144/3 D |
| 4,711,280 | 12/1987 | Schmidt | 144/208 J |
| 4,721,139 | 1/1988 | Peterson et al. | 144/246 C |

FOREIGN PATENT DOCUMENTS

| | | | |
|---|---|---|---|
| 431010 | 8/1975 | U.S.S.R. | 144/246 A |
| 712248 | 1/1980 | U.S.S.R. | 144/246 R |

OTHER PUBLICATIONS

"Logging and Sawmilling Journal", MacLean Hunter Ltd., Vancouver, British Columbia, Sep. 1988, vol. 19, No. 9, pp. 8; 38–43, 45.

*Primary Examiner*—W. Donald Bray
*Attorney, Agent, or Firm*—Seed and Berry

[57] ABSTRACT

A log feed roller mechanism has a pair of parallel drive rolls; a plurality of contour-edged bars flexibly mounted at spaced intervals around the outer surfaces of each of the rolls; and, a drive mechanism for drivingly counter-rotating the rolls about their respective longitudinal axes.

24 Claims, 6 Drawing Sheets

LOG FEED ROLLER MECHANISM

FIELD OF THE INVENTION

This application pertains to a roller mechanism for feeding logs in either direction along their longitudinal axes. The invention has particular application as a continuous tree feeding device for a delimbing machine.

BACKGROUND OF THE INVENTION

Delimbing machines are used to strip the branches off (i.e. "delimb") felled trees and to cut the delimbed tree into logs of selected length for subsequent transportation to log processing plants. Delimbing machines conventionally incorporate a slidably positionable boom which is rotatably and pivotably mounted above a processing platform. A pair of grapple arms are mounted at the free end of the boom. The machine operator extends the boom and manipulates it to position the open grapple arms around a felled tree. After closing the grapple arms tightly around the tree, the machine operator raises the boom to lift the grappled tree off the ground and then slidably retracts the boom. This action propels the tree along its longitudinal axis relative to a cutting mechanism which delimbs the tree. The boom and tree are then slidably extended and the grapple arms opened to free the delimbed tree from the machine. Optionally, the operator may actuate a cutting mechanism to cut the delimbed tree into selected lengths at one or more intervals as the boom and delimbed tree are extended.

The art has evolved two basic types of delimbing machines. "Stroke delimbers" are configured and operate essentially as described above; one or more supporting arms being provided on the processing platform to support the free end of the tree at points displaced from the grapple arms as the tree is longitudinally propelled with the aid of the sliding boom. In an effort to increase productivity, a second type of tree delimbing machine known as a "roll-stroke delimber" has been developed. Roll-stroke delimbers incorporate a mechanism for continuously feeding the free end of the tree (i.e. the end which is displaced from the grapple arms) thereby reducing stresses imparted to the machine and to the machine operator by conventional stroke delimbers and significantly increasing productivity, particularly in the processing of long trees.

Continuous tree feeding mechanisms conventionally comprise a pair of feed rollers which are pressed against opposite sides of the tree and counter-rotated relative to one another, thereby propelling the tree along its longitudinal axis toward or away from the delimbing machine, depending upon the direction of rotation of the feed rollers. In order to ensure adequate traction between the tree and the feed rollers, various gripping mechanisms have been provided on the feed roller outer surfaces. For example, prior art delimbers have employed log feed rollers studded with spikes which bite into the tree outer surface as the rollers are rotated against the tree. Unfortunately, the spikes penetrate not only the tree bark but also the wood of the tree, damaging the wood and reducing production yields.

Rubber covered log feed rollers have also been employed in prior art delimbers in an effort to eliminate the wood damage caused by spiked rollers. Although rubber rollers facilitate damage-free log feeding, production problems are experienced if the rubber rollers are unable to attain adequate traction against the surface of the tree. For example, if the tree bark is removed, or if the tree is wet, then the rollers tend to slip against the surface of the tree, without adequately feeding the tree relative to the delimbing machine, thus diminishing production yields.

As a compromise, the art has evolved spiked chains which are sometimes used instead of feed rollers. The spiked chains are driven around extended tracks arranged on opposite sides of the tree. Because the area of each chain which contacts the tree is significantly greater than the contact area of the aforementioned rollers, comparatively short spikes can be provided on the chains to obtain tractive force approximating that of spiked rollers. The shorter chain spikes cause considerably less wood damage than spiked rollers, but there is nevertheless some wood damage which is preferably avoided altogether.

Yet another prior art continuous tree feeding mechanism utilizes a pair of ribbed, contoured feed rollers. Such rollers are of approximately hourglass-shaped cross section, as distinct from the generally straight-edged cross section of the cylindrical spiked or rubber feed rollers discussed above. The space between the opposed, hourglass-shaped rollers defines a guideway which varies in cross section as the tree is fed through the rollers. That is, the shape of the guideway is more or less continuously conformed to the shape of the tree at the point between the rollers, thereby maximizing the roller-to-tree contact area throughout the delimbing operation. The roller outer surfaces are provided with extended knife-like ribs in order to obtain sufficient tractive force to propel the tree back and forth relative to the cutting mechanism which delimbs the tree. Unfortunately, some wood damage unavoidably results with this arrangement as well.

Those skilled in the art will appreciate that there is a need for a log feed roller mechanism capable of increasing the throughput of a delimbing machine while minimizing wood damage.

SUMMARY OF THE INVENTION

In accordance with the preferred embodiment, the invention provides a log feed roller mechanism having at least one drive roll. A plurality of contour-edged bars are flexibly mounted at spaced intervals around the outer surface of the roll. A drive means drivingly rotates the roll about its longitudinal axis. The roll is preferably cylindrical. The bars preferably lie generally parallel to the axis of the roll. The bars are also preferably flat surfaced Advantageously, the bars lie in planes tangential to the roll outer surface. The flexible mounting aforesaid preferably allows the bars to pivot through planes tangential to the roll outer surface.

Advantageously, the bars' contoured edges incorporate a series of alternating curved projections and curved indentations along each edge of each of the bars. The curved projections along one edge of each bar preferably lie transversely opposed to the curved indentations along the opposite edge of each bar.

Preferably, a pair of drive rolls are provided; the rolls being mounted with their longitudinal axes parallel to one another. The drive means drivingly counter-rotates the rolls about their respective longitudinal axes. Advantageously, a biasing means is provided to urge the rolls toward one another.

DETAILED DESCRIPTION OF THE PREFERRED EMBODIMENT

Figure 1:
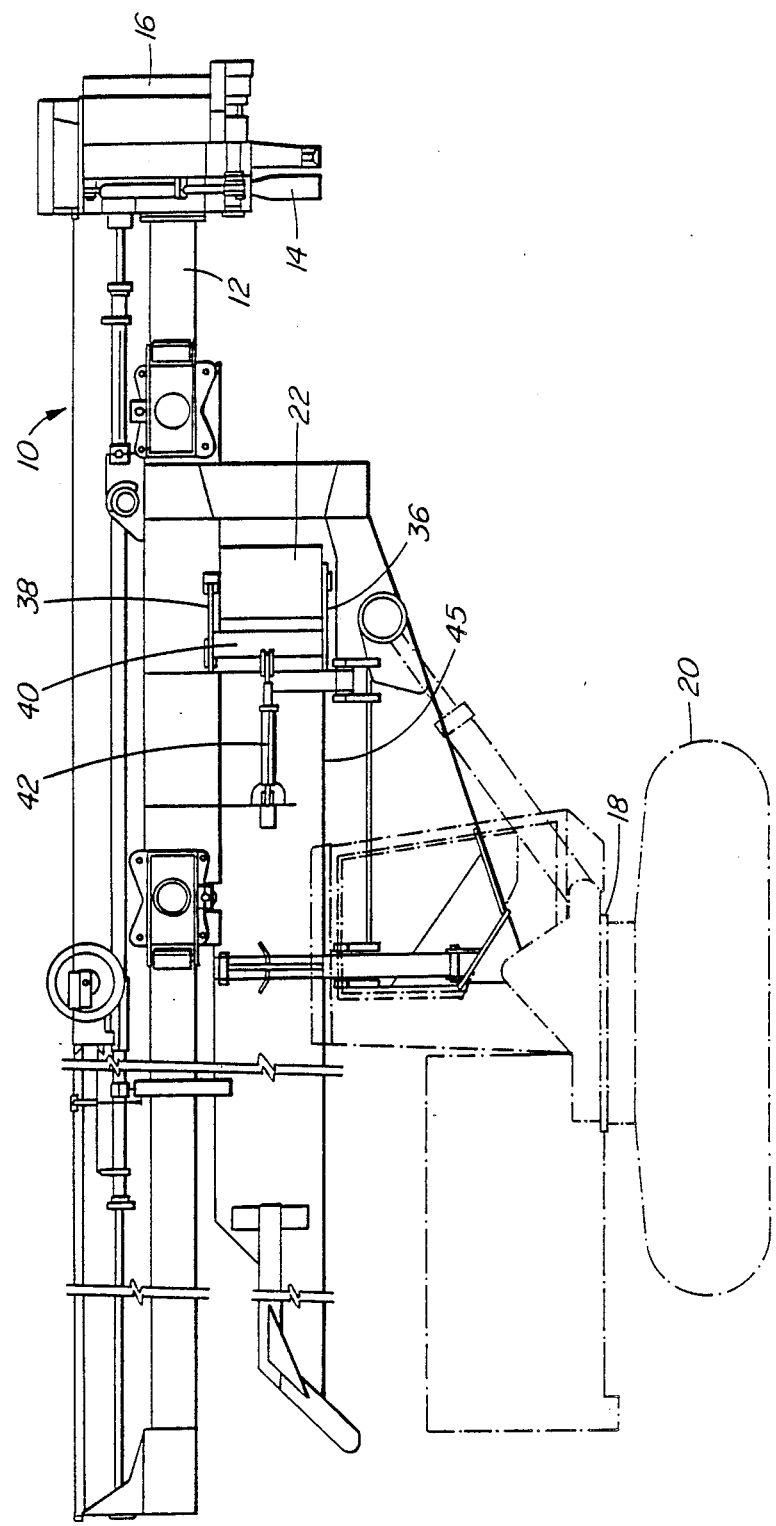
FIG. 1 is a side elevation view of a roll-stroke delimber having a log feed roller mechanism in accordance with the preferred embodiment of the invention.

FIG. 1 illustrates a roll-stroke delimber 10 having a slidably displaceable boom 12 with a tree grapple 14 and saw 16 mounted at the free end of boom 12. Boom 12 is rotatably and pivotally supported above platform 18. Platform 18 is in turn mounted on a pair of treads 20 which are driven in conventional fashion to propel delimber 10 relative to felled trees which are to be delimbed.

Roll-stroke delimber 10 may be actuated by its operator to tightly close grapple 14 about the butt of a felled tree and to retract boom 12 and, with it, the tree, toward log feed roller mechanism 22 which, once grapple 14 is released, grips the tree and propels it backwardly through tree guide tube 45. The tree is delimbed as its branches strike the arms of grapple 14 or cutters mounted at the forward end of tube 45. Once the tree has been delimbed log feed roller mechanism 22 may be actuated to propel the delimbed tree forwardly through tree guide tube 45. Saw 16 is actuated at selected intervals to buck the delimbed tree into desired lengths.

Figure 6:
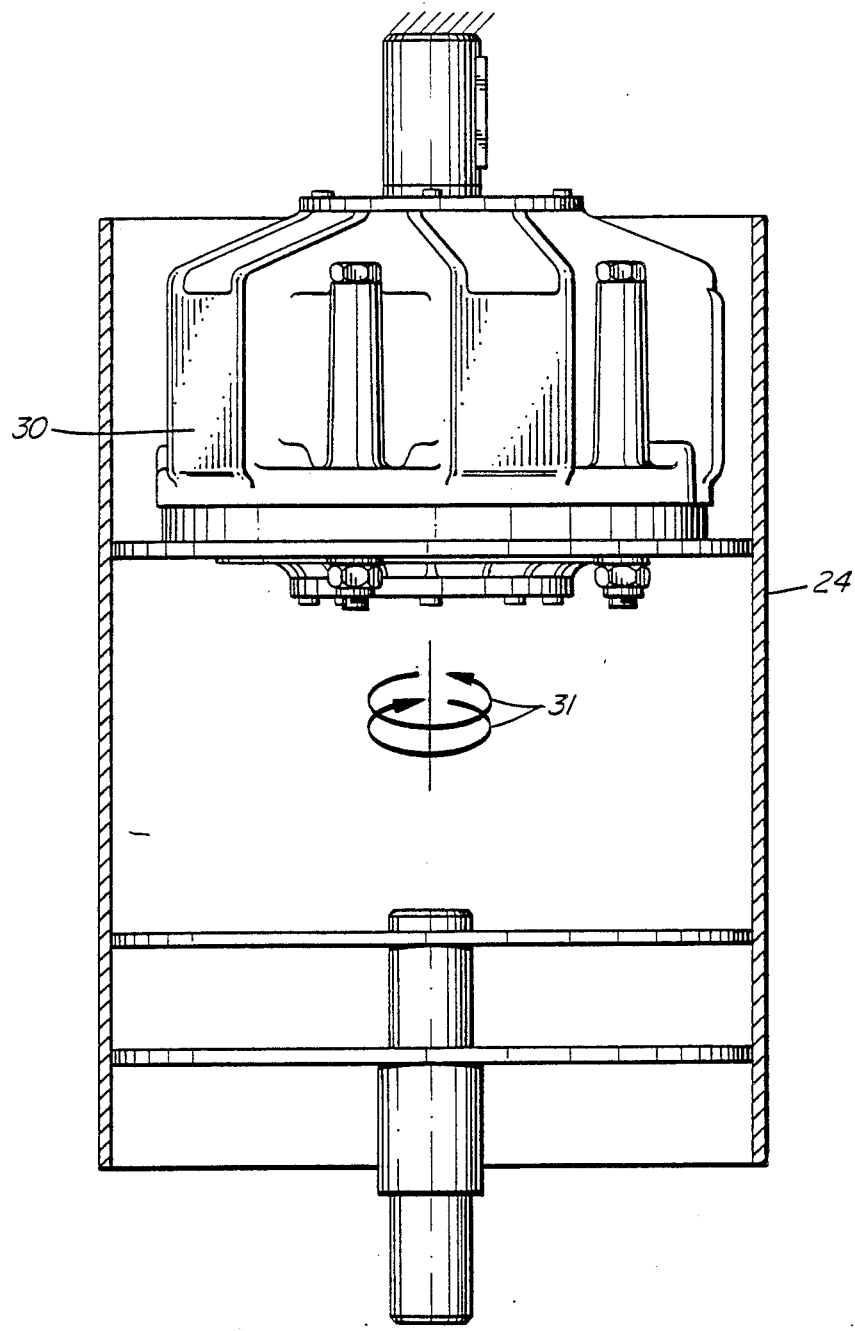
FIG. 6 is a section view taken with respect to line 6—6 of FIG. 3.

Log feed roller mechanism 22 (FIG. 2) comprises a pair of drive rolls 24, 26 mounted parallel to one another (i.e. the longitudinal axes of rolls 24, 26 are parallel to one another and remain generally parallel to one another throughout the operation of delimber 10). A plurality of contour or curvilinear edged bars 28 are mounted at circumferentially spaced intervals around the outer surfaces of each of rolls 24, 26. A "drive means", namely hydraulic motor 30 (FIG. 6) is provided inside each of rolls 24, 26 and coupled thereto for drivably counterrotating rolls 24, 26 about their respective longitudinal axes. That is, motor 30 is capable of rotating roll 24 in either of the two directions illustrated by arrows 31 in FIG. 6. Similar provision is made for bidirectional rotation of roll 26.

Figure 3:
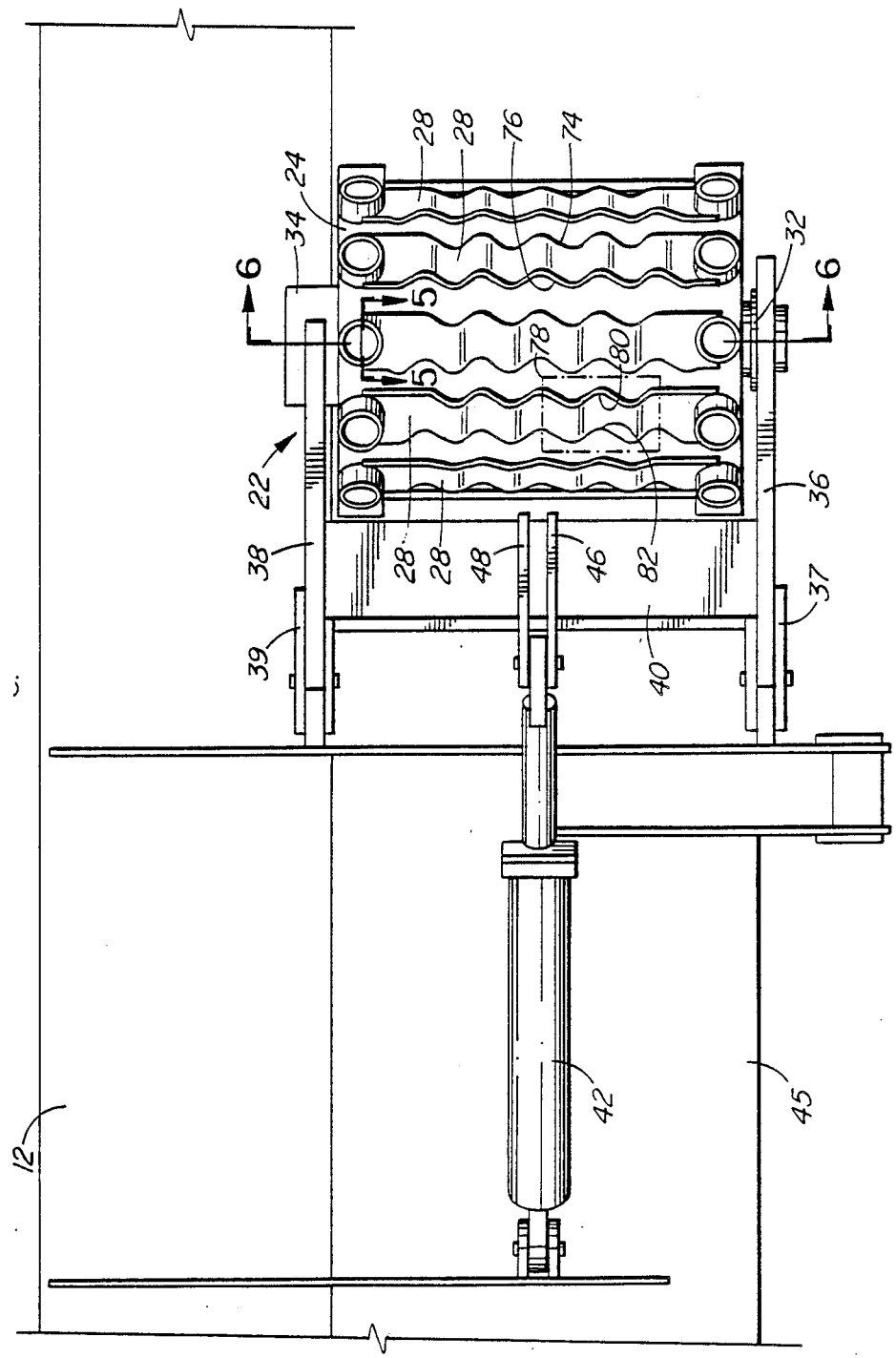
FIG. 3 is an enlarged side elevation view of the log feed roller mechanism.
Figure 4:
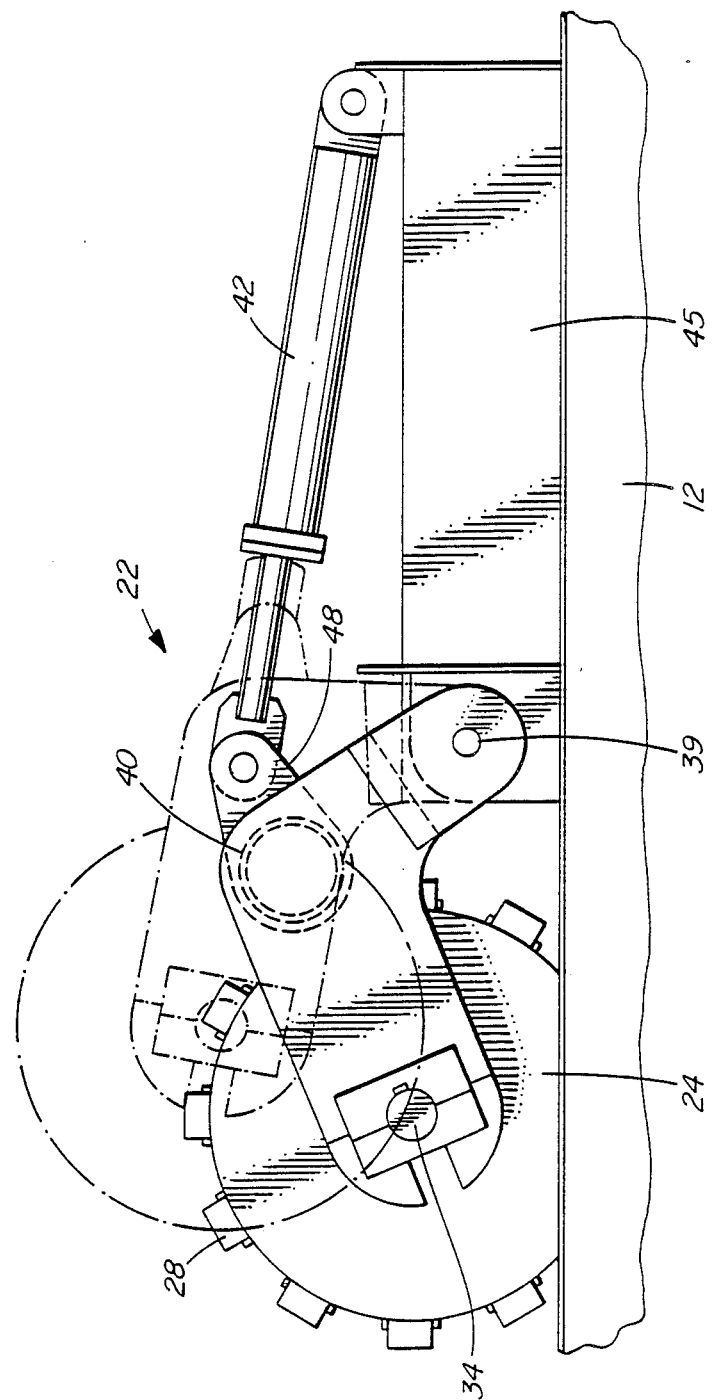
FIG. 4 is an enlarged top view of one half of the log feed roller mechanism.

As best seen in FIGS. 3 and 4, rolls 24, 26 are supported at their opposed ends by axial bearings 32, 34 which are journalled for rotation in the ends of support arms 36, 38 respectively. The opposite ends of each of arms 36, 38 are pivotally attached to the sides of boom 12 with the aid of bearings 37, 39. Link member 40 extends between arms 36, 38 to provide a rigid frame for pivotally and rotatably supporting rolls 24, 26 relative to boom 12. A pair of hydraulic cylinders (only one of which; namely, cylinder 42 is visible in the drawings) are mounted on opposed sides of boom 12 by pivotally connecting one end of each cylinder to tree guide tube 45 and by pivotally connecting the opposed ends of each cylinder to plates 46, 48 respectively which project from and are rigidly connected to link member 40. By suitably actuating the hydraulic cylinder pair aforesaid, the operator may thus manipulate drive rolls 24, 26 between the open position shown in dotted outline in FIG. 4 and the closed position shown in full outline in that Figure. In practice, the hydraulic cylinders are preferably biased, with the aid of a suitable hydraulic circuit (i.e. "biasing means"), to urge rolls 24, 26 toward one another in order to maintain adequate tractive drive forces on the tree at all times.

Figure 5:
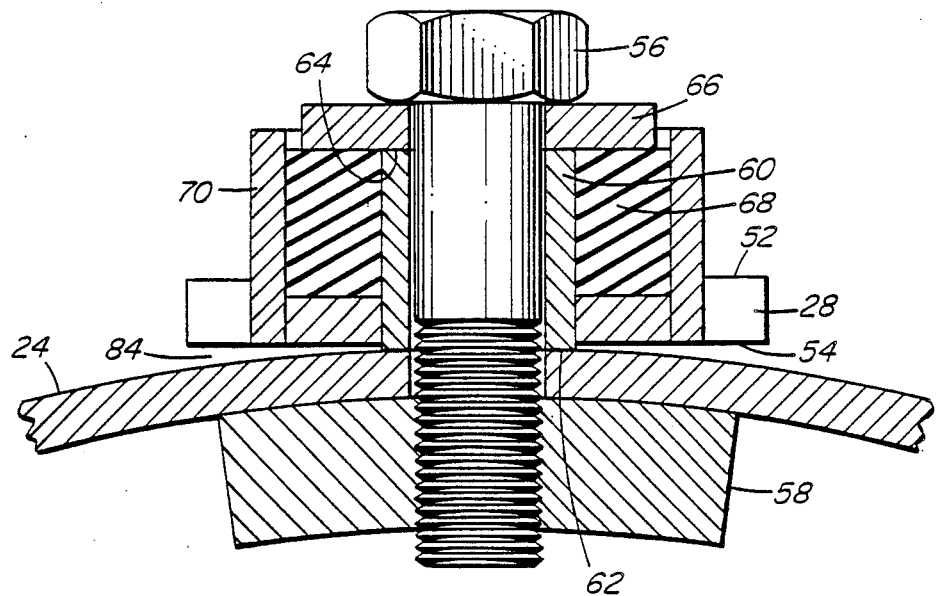
FIG. 5 is a section view (on an enlarged scale) taken with respect to line 5—5 of FIG. 3.

Drive rolls 24, 26 are preferably cylindrical in cross section as depicted in FIG. 4. Bars 28 preferably lie generally parallel to the longitudinal roll axis as depicted in FIG. 3. FIG. 5 provides a detailed illustration of the preferred manner in which bars 28 are flexibly mounted to rolls 24, 26. As may be seen in FIG. 5, bar 28 has flat upper and lower surfaces 52, 54. Bar lower surface 54 lies in a plane which is tangential to the outer circumferential surface of drive roll 24. Apertures are provided in each end of each of bars 28 to receive threaded bolt 56 which passes through the bar aperture and through a corresponding aperture in drive roll 24. Fastener 58 is threadably fastened on to the end of bolt 56 which projects inside drive roll 24. A "rigid spacer"; namely, hardened bushing 60 surrounds bolt 56 and projects through the bar aperture, such that the bushing lower cylindrical edge 62 bears against the outer surface of drive roller 24. The upper cylindrical edge 64 of bushing 60 bears against an "upper rigid layer"; namely, apertured metal cap 66 through which bolt 56 also passes. A resilient, deformable rubber washer 68 encircles bushing 60 and lies within a recess having circular sides defined by an upwardly projecting support member; namely, circular lip 70 provided on bar 28, and having a closed top defined by cap 66.

Figure 2:
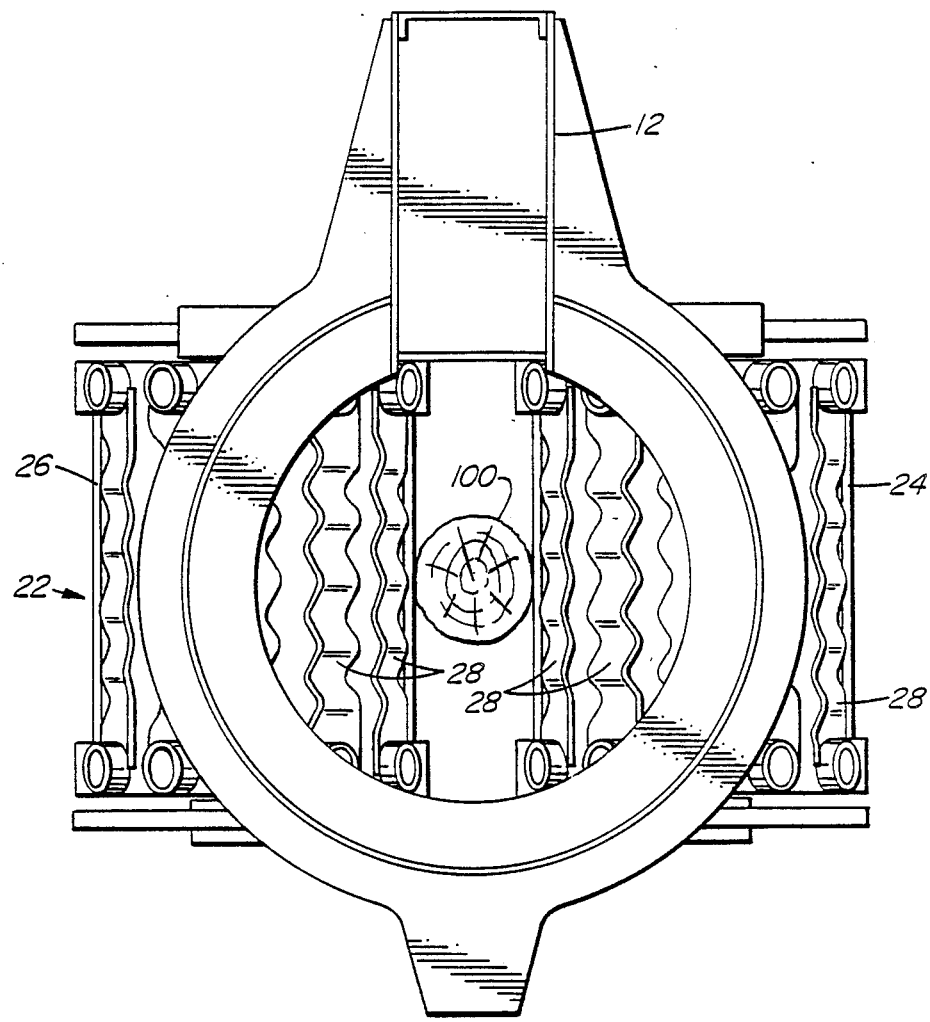
FIG. 2 is an enlarged end view of the log feed roller mechanism.

It will be understood that the flexible mounting arrangement hereinbefore described allows each of bars 28 to pivot or deflect through a series of planes tangential to the roll outer surfaces, thereby minimizing the potential for dislodgment of bars 28 from rolls 24, 26 while maximizing the tractive force applied to tree 100 (FIG. 2). More particularly, as drive rolls 24, 26 are counter-rotated against tree 100, one or the other of the edges of a particular bar, such as bar outer edges 74, 76 depicted in FIG. 3 contacts the tree. The resultant force deflects the contacted edge of the bar toward the roll outer surface. The force is transmitted through bar 28, bushing 60 and bolt 56 to washer 68, causing bolt 56 to tilt toward the deflected bar edge, and causing washer 68 to compress in its central region surrounding bushing 60, thereby absorbing the force. After the roll has rotated to a position in which the particular bar aforesaid no longer contacts tree 100, washer 68 resumes its shape depicted in FIG. 5, thereby returning bolt 56, bushing 60 and bar 28 to the positions depicted in FIG. 5.

FIG. 3 illustrates the preferred contour- edged or curvilinear-edged configuration of bars 28. Consider more particularly portion 78 of bar 28 depicted in FIG. 3. Bar portion 78 incorporates a curved projection 80 along one edge of the bar and a corresponding curved indentation 82 along the adjacent section of the opposite edge of the bar. This arrangement is repeated along each of bars 28. Because bars 28 are flat surfaced, projections 80 are displaced outwardly from the cylindrical outer surfaces of drive rolls 24, 26, leaving a gap 84 (FIG. 5) between bar lower surface 54 and the outer roll surface. Accordingly, when drive rolls 24, 26 are drivingly rotated against the outer surface of tree 100, projections 80 make initial contact with the tree. The bars in contact with tree 100 deflect toward rolls 24, 26 in the manner described above. Indentations 82 facilitate such deflection by minimizing the application, along opposed edges of bar 28, of forces which tend to deflect bar 28 in opposite directions.

As will be apparent to those skilled in the art in the light of the foregoing disclosure, many alterations and modifications are possible in the practice of this invention without departing from the spirit or scope thereof. For example, only a single drive roll is strictly required, although a pair of drive rolls are preferred. If only a single drive roll is provided, then a freewheeling roll could, for example, replace the second drive roll. Accordingly, the scope of the invention is to be construed in accordance with the substance defined by the following claims.

I claim:

1. A log feed roller mechanism, comprising:
   (a) at least one rigid drive roll;
   (b) a plurality of rigid contour-edged bars flexibly mounted at spaced intervals around the outer surfaces of said roll; and,
   (c) drive means for drivingly rotating said roll about its longitudinal axis.

2. A log feed roller mechanism as defined in claim 1, wherein said roll is cylindrical.

3. A log feed roller mechanism as defined in claim 1, wherein said bars lie generally parallel to said roll axis.

4. A log feed roller mechanism as defined in claim 2, wherein said bars are flat surfaced.

5. A log feed roller mechanism as defined in claim 4, wherein said bars lie in planes tangential to said roll outer surface.

6. A log feed roller mechanism as defined in claim 5, wherein said flexible mounting allows said bars to pivot through planes tangential to said roll outer surface.

7. A log feed roller mechanism as defined in claim 1, wherein said bar contoured edges further comprise a curved projection along a portion of one edge of each of said bars and a corresponding curved indentation along the adjacent portion of the opposite edge of each of said bars.

8. A log feed roller mechanism as defined in claim 1, wherein said bar contoured edges comprise a series of alternating curved projections and curved indentations along each edge of each of said bars.

9. A log feed roller mechanism as defined in claim 8, wherein said curved projections along one edge of each of said bars lie transversely opposed to said curved indentations along the opposite edge of each of said bars.

10. A log feed roller mechanism as defined in claim 1, wherein said flexible mounting comprises:
    (a) first and second hardened bushings respectively receivable in first and second apertures in opposed ends of each of said bars to project outwardly therefrom;
    (b) first and second resilient washers for encircling the projecting portions of said first and second bushings respectively;
    (c) first and second support members spaced outwardly from and encircling said first and second bar apertures respectively, for supporting said first and second washers respectively;
    (d) first and second apertured caps mountable atop said first and second washers respectively;
    (e) first and second bolts for passing, respectively, through said first and second cap apertures, said first and second bushing apertures and through first and second apertures in said roll outer surface to project therethrough; and,
    (f) first and second nuts threadably receivable on the projecting portions of said first and second bolts respectively.

11. A log feed roller mechanism as defined in claim 1 further comprising a pair of said drive rolls mounted with their longitudinal axes parallel to one another.

12. A log feed roller mechanism as defined in claim 11, wherein said drive means is further for drivingly counter-rotating said rolls about their respective longitudinal axes.

13. A log feed roller mechanism as defined in claim 12, further comprising biasing means for urging said rolls toward one another.

14. A log feed roller mechanism, comprising:
    (a) at least one cylindrical drive roll having a central longitudinal axis and an exterior surface;
    (b) an array of parallel, circumferentially spaced bars mounted on said surface and aligned generally parallel to said axis; said bars having curvilinear, log-engaging side edges and substantially flat upper and lower surfaces; and,
    (c) flexible mounting means for flexibly securing said bars to said surface.

15. A log feed roller mechanism as defined in claim 14, wherein said mounting means comprises a layer of resiliently deformable material bearing against a flat surface of said bar.

16. A log feed roller mechanism as defined in claim 15, wherein said resilient layer bears against said bar upper surface and wherein said mounting means further comprises:
    (a) an upper rigid layer bearing against an upper surface of said resilient layer; and,
    (b) a rigid spacer extending between said upper rigid layer and said roll exterior surface to prevent compression of said resilient layer in a central region thereof.

17. A log feed roller mechanism as defined in claim 16, wherein said mounting means further comprises a threaded nut and bolt, and wherein said spacer comprises a cylindrical bushing for surrounding said bolt.

18. A log feed roller mechanism as defined in claim 17, wherein said resilient layer comprises a rubber washer and wherein said upper rigid layer comprises a metal cap having downwardly extending edges.

19. A log feed roller mechanism as defined in claim 14, wherein said bar side edges further comprise a curved projection along a portion of one edge of each of said bars and a corresponding curved indentation along the adjacent portion of the opposite edge of each of said bars.

20. A log feed roller mechanism as defined in claim 14, wherein said bar side edges further comprise a series of alternating curved projections and curved indentations along each edge of each of said bars.

21. A log feed roller mechanism as defined in claim 20, wherein said curved projections along one edge of each of said bars lie transversely opposed to said curved indentations along the opposite edge of each of said bars.

22. A log feed roller mechanism as defined in claim 14, further comprising a pair of said drive rolls mounted with their longitudinal axes parallel to one another.

23. A log feed roller mechanism as defined in claim 22, wherein said drive means is further for drivingly counter-rotating said rolls about their respective longitudinal axes.

24. A log feed roller mechanism as defined in claim 22, further comprising biasing means for urging said rolls toward one another.

* * * * *